(12) United States Patent
Yuasa et al.

(10) Patent No.: US 11,122,410 B2
(45) Date of Patent: Sep. 14, 2021

(54) INFORMATION PROCESSING APPARATUS, INFORMATION PROCESSING METHOD, AND INFORMATION PROCESSING SYSTEM

(71) Applicant: SONY CORPORATION, Tokyo (JP)

(72) Inventors: Naoki Yuasa, Chiba (JP); Takashi Onohara, Tokyo (JP); Koji Fujita, Tokyo (JP); Ryo Sokabe, Saitama (JP)

(73) Assignee: SONY CORPORATION, Tokyo (JP)

( * ) Notice: Subject to any disclaimer, the term of this patent is extended or adjusted under 35 U.S.C. 154(b) by 58 days.

(21) Appl. No.: 16/339,167

(22) PCT Filed: Oct. 18, 2017

(86) PCT No.: PCT/JP2017/037613
§ 371 (c)(1),
(2) Date: Apr. 3, 2019

(87) PCT Pub. No.: WO2018/096845
PCT Pub. Date: May 31, 2018

(65) Prior Publication Data
US 2019/0281436 A1  Sep. 12, 2019

(30) Foreign Application Priority Data

Nov. 25, 2016  (JP) ............................. JP2016-229278

(51) Int. Cl.
*H04W 8/00* (2009.01)
*H04W 4/80* (2018.01)
(Continued)

(52) U.S. Cl.
CPC ............. *H04W 8/005* (2013.01); *H04L 5/005* (2013.01); *H04W 4/80* (2018.02); *H04W 8/26* (2013.01);
(Continued)

(58) Field of Classification Search
CPC ....... H04W 8/005; H04W 4/80; H04W 76/10; H04W 8/26; H04W 48/08; H04W 48/16; H04W 12/08; H04W 84/12; H04L 5/005
See application file for complete search history.

(56) References Cited

U.S. PATENT DOCUMENTS

2008/0261640 A1    10/2008  Yoshida
2013/0170420 A1*   7/2013   Kobayashi .......... H04W 52/245
                                               370/311
(Continued)

FOREIGN PATENT DOCUMENTS

CN    1943170 A       4/2007
CN    103795882 A     5/2014
(Continued)

OTHER PUBLICATIONS

Extended European Search Report of EP Application No. 17873180.8, dated Sep. 20, 2019, 10 pages.
(Continued)

*Primary Examiner* — Duc C Ho
(74) *Attorney, Agent, or Firm* — Chip Law Group

(57) ABSTRACT

An information processing apparatus according to an embodiment of the present technology includes a reception unit, a detection unit, and a transmission unit. The reception unit receives a beacon signal transmitted from each of a plurality of first apparatuses. The detection unit detects an unconnected apparatus from the plurality of first apparatuses on the basis of the received beacon signal, the unconnected apparatus being not communicably connected to a second apparatus. The transmission unit transmits setting information for communicably connecting to the second apparatus to the detected unconnected apparatus.

10 Claims, 6 Drawing Sheets

(51) Int. Cl.
| | |
|---|---|
| *H04W 76/10* | (2018.01) |
| *H04L 5/00* | (2006.01) |
| *H04W 8/26* | (2009.01) |
| *H04W 48/16* | (2009.01) |
| *H04W 48/08* | (2009.01) |
| *H04W 84/12* | (2009.01) |
| *H04W 12/08* | (2021.01) |

(52) U.S. Cl.
CPC .......... *H04W 48/08* (2013.01); *H04W 48/16* (2013.01); *H04W 76/10* (2018.02); *H04W 12/08* (2013.01); *H04W 84/12* (2013.01)

(56) References Cited

U.S. PATENT DOCUMENTS

| | | | |
|---|---|---|---|
| 2014/0118778 A1 | 5/2014 | Lee et al. | |
| 2014/0366105 A1 | 12/2014 | Bradley et al. | |
| 2015/0186082 A1 | 7/2015 | Lee et al. | |
| 2015/0355875 A1 | 12/2015 | Matsushita et al. | |
| 2016/0192259 A1* | 6/2016 | Ogawara | H04W 76/10 455/436 |
| 2016/0313950 A1 | 10/2016 | Kimura | |
| 2018/0083796 A1* | 3/2018 | Suyama | H04W 12/35 |
| 2018/0121158 A1* | 5/2018 | Hinokio | G10K 15/02 |

FOREIGN PATENT DOCUMENTS

| | | |
|---|---|---|
| CN | 105284178 A | 1/2016 |
| EP | 2725774 A2 | 4/2014 |
| EP | 3008966 A1 | 4/2016 |
| JP | 2005-303821 A | 10/2005 |
| JP | 2013-211648 A | 10/2013 |
| JP | 2015-233180 A | 12/2015 |
| JP | 2016-012910 A | 1/2016 |
| JP | 6530634 B2 | 6/2019 |
| KR | 10-2007-0002050 A | 1/2007 |
| KR | 10-2015-0140592 A | 12/2015 |
| KR | 10-2016-0005362 A | 1/2016 |
| TW | 201505475 A | 2/2015 |
| TW | 201725932 A | 7/2017 |
| WO | 2014/200691 A1 | 12/2014 |
| WO | 2016/103546 A1 | 6/2016 |

OTHER PUBLICATIONS

International Search Report and Written Opinion of PCT Application No. PCT/JP2017/037613, dated Jan. 16, 2018, 9 pages of ISRWO.

* cited by examiner

INFORMATION PROCESSING APPARATUS, INFORMATION PROCESSING METHOD, AND INFORMATION PROCESSING SYSTEM

CROSS REFERENCE TO RELATED APPLICATIONS

This application is a U.S. National Phase of International Patent Application No. PCT/JP2017/037613 filed on Oct. 18, 2017, which claims priority benefit of Japanese Patent Application No. JP 2016-229278 filed in the Japan Patent Office on Nov. 25, 2016. Each of the above-referenced applications is hereby incorporated herein by reference in its entirety.

TECHNICAL FIELD

The present technology relates to an information processing apparatus, an information processing method, a program, and an information processing system that are applicable to, for example, connection to an access point.

BACKGROUND ART

In the past, there has been known a system in which a reproduction apparatus is connected to a home network, which is established in a house, via an access point, to reproduce content such as music or video. For example, Patent Literature 1 describes the technology of connecting a plurality of reproduction apparatuses to a network via an access point and reproducing content in synchronization in units of groups (paragraphs [0026] to [0028] and [0043] to [0046], FIGS. 1 and 8, and the like in the specification of Patent Literature 1).

Further, Patent Literature 2 discloses the technology that enables a new wireless communication apparatus to be easily connected to an access point. In the wireless system described in Patent Literature 2, a wireless communication apparatus connected to an access point uploads setting information for connecting to the access point to a setting server on a network. Further, the wireless communication apparatus also transmits information of a wireless communication apparatus permitted to access the uploaded setting information. By accessing the setting server via another network such as a 3G network, the wireless communication apparatus permitted to access the setting information can easily acquire the setting information. Therefore, when a new wireless communication apparatus is permitted to access the setting information, the wireless communication apparatus can be easily connected to the access point (paragraphs [0122] to [0142], FIG. 11, and the like in the specification of Patent Literature 2).

CITATION LIST

Patent Literature

Patent Literature 1: WO 2016/103546
Patent Literature 2: Japanese Patent Application Laid-open No. 2013-211648

DISCLOSURE OF INVENTION

Technical Problem

The reproduction system that controls a plurality of reproduction apparatuses via a network as described in Patent Literature 1 or the like is considered to prevail also in the future. There is a demand for the technology that enables a newly disposed wireless communication apparatus to be easily connected to an access point as described in Patent Literature 2.

In view of the circumstances as described above, it is an object of the present technology to provide an information processing apparatus, an information processing method, a program, and an information processing system that are capable of easily executing connection to an access point.

Solution to Problem

In order to achieve the object described above, an information processing apparatus according to an embodiment of the present technology includes a reception unit, a detection unit, and a transmission unit.

The reception unit receives a beacon signal transmitted from each of a plurality of first apparatuses.

The detection unit detects an unconnected apparatus from the plurality of first apparatuses on the basis of the received beacon signal, the unconnected apparatus being not communicably connected to a second apparatus.

The transmission unit transmits setting information for communicably connecting to the second apparatus to the detected unconnected apparatus.

In this information processing apparatus, an unconnected apparatus is detected on the basis of a beacon signal transmitted from each of the plurality of first apparatuses. Additionally, setting information for communicably connecting to a second apparatus is transmitted to an unconnected apparatus. When the present technology is applied to a network-ready device (first apparatus) and an access point (second apparatus), connection to an access point can be easily executed.

The information processing apparatus may further include a first communication unit that is communicably connected to each of the plurality of first apparatuses on the basis of the received beacon signal. In this case, the transmission unit may transmit the setting information via the first communication unit.

When the connection based on the beacon signal is executed, the setting information can be easily transmitted.

The detection unit may detect, as the unconnected apparatus, each of first apparatuses in the plurality of first apparatuses, each of the first apparatuses having transmitted the received beacon signal.

Accordingly, an undetected apparatus can be easily detected.

The information processing apparatus may further include a second communication unit and a request unit.

The second communication unit is communicably connected to the second apparatus.

The request unit requests restriction of transmission of the beacon signal to a connected apparatus in the plurality of first apparatuses via the second communication unit and the second apparatus, the connected apparatus being communicably connected to the second apparatus.

Accordingly, since it is possible to restrict the transmission of the beacon signal of the connected apparatus, it is possible to easily detect an apparatus, which has transmitted the beacon signal, as an unconnected apparatus.

The detection unit may acquire information regarding whether the first apparatus is the unconnected apparatus or not from each of the plurality of first apparatuses via the first communication unit and detect the unconnected apparatus.

Accordingly, the unconnected apparatus can be easily detected on the basis of the beacon signal.

The second apparatus may be an access point that establishes a wireless network. In this case, the unconnected apparatus may be an apparatus that is not connected to the wireless network. Further, the setting information may include an SSID (Service Set Identifier) that identifies the access point, and a password.

Accordingly, the unconnected apparatus can be easily connected to a wireless network via an access point.

The beacon signal may be a BLE (Bluetooth Low Energy) beacon signal conforming to a BLE standard. In this case, the transmission unit may transmit the setting information to the unconnected apparatus via BLE communication based on the BLE beacon signal.

Accordingly, the setting information can be easily transmitted.

The connected apparatus may be an apparatus that is connected to the wireless network. In this case, the request unit may transmit a request to the connected apparatus via the wireless network, the request indicating the restriction of the transmission of the beacon signal.

Accordingly, it is possible to easily restrict the transmission of the beacon signal from the connected apparatus.

The detection unit may acquire information regarding whether the first apparatus is the unconnected apparatus or not via BLE communication based on the BLE beacon signal.

Accordingly, it is possible to easily detect the unconnected apparatus.

An information processing method according to an embodiment of the present technology is an information processing method to be executed by a computer system, the information processing method including: receiving a beacon signal transmitted from each of a plurality of first apparatuses; detecting an unconnected apparatus from the plurality of first apparatuses on the basis of the received beacon signal, the unconnected apparatus being not communicably connected to a second apparatus; and transmitting setting information for communicably connecting to the second apparatus to the detected unconnected apparatus.

A program according to an embodiment of the present technology causes a computer system to execute the following steps of: receiving a beacon signal transmitted from each of a plurality of first apparatuses; detecting an unconnected apparatus from the plurality of first apparatuses on the basis of the received beacon signal, the unconnected apparatus being not communicably connected to a second apparatus; and transmitting setting information for communicably connecting to the second apparatus to the detected unconnected apparatus.

An information processing system according to an embodiment of the present technology includes a communication apparatus, a plurality of apparatuses, and a control apparatus The plurality of apparatuses each detect whether the apparatus is communicably connected to the communication apparatus or not, and transmit a beacon signal in a case where the apparatus is not communicably connected to the communication apparatus.

The control apparatus transmits setting information for communicably connecting to the communication apparatus to an unconnected apparatus in the plurality of apparatuses on the basis of a beacon signal transmitted from the unconnected apparatus, the unconnected apparatus being not communicably connected to the communication apparatus.

In this information processing system, each of the plurality of apparatuses detects whether the apparatus is connected to the communication apparatus or not. Additionally, in a case where the apparatus is not connected to the communication apparatus, the beacon signal is transmitted. The transmitted beacon signal is received by the control apparatus, and the setting information is transmitted to the apparatus that has transmitted the beacon signal. Accordingly, it is possible to easily connect the unconnected apparatus to the communication apparatus and, for example, easily execute connection to an access point.

An information processing system according to another embodiment of the present technology includes a communication apparatus, a plurality of apparatuses, and a control apparatus.

The plurality of apparatuses each transmit a beacon signal.

The control apparatus includes a communication unit, a request unit, and a transmission unit.

The communication unit is communicably connected to the communication apparatus.

The request unit requests restriction of transmission of the beacon signal to a connected apparatus in the plurality of apparatuses via the communication unit and the communication apparatus, the connected apparatus being communicably connected to the communication apparatus.

The transmission unit transmits setting information for communicably connecting to the communication apparatus to an unconnected apparatus in the plurality of apparatuses on the basis of the beacon signal transmitted from the unconnected apparatus, the unconnected apparatus being not communicably connected to the communication apparatus.

In this information processing system, the restriction of the transmission of the beacon signal is requested to the connected apparatus via the communication apparatus. Additionally, the setting information is transmitted to the unconnected apparatus on the basis of the beacon signal transmitted from the unconnected apparatus. Accordingly, it is possible to easily connect the unconnected apparatus to the communication apparatus and, for example, easily execute connection to an access point.

Advantageous Effects of Invention

As described above, according to the present technology, it is possible to easily execute connection to an access point. It should be noted that the effect described here is not necessarily limitative and may be any effect described in the present disclosure.

MODE(S) FOR CARRYING OUT THE INVENTION

Hereinafter, embodiments according to the present technology will be described with reference to the drawings.

First Embodiment

[Content Reproduction System]

Figure 1:
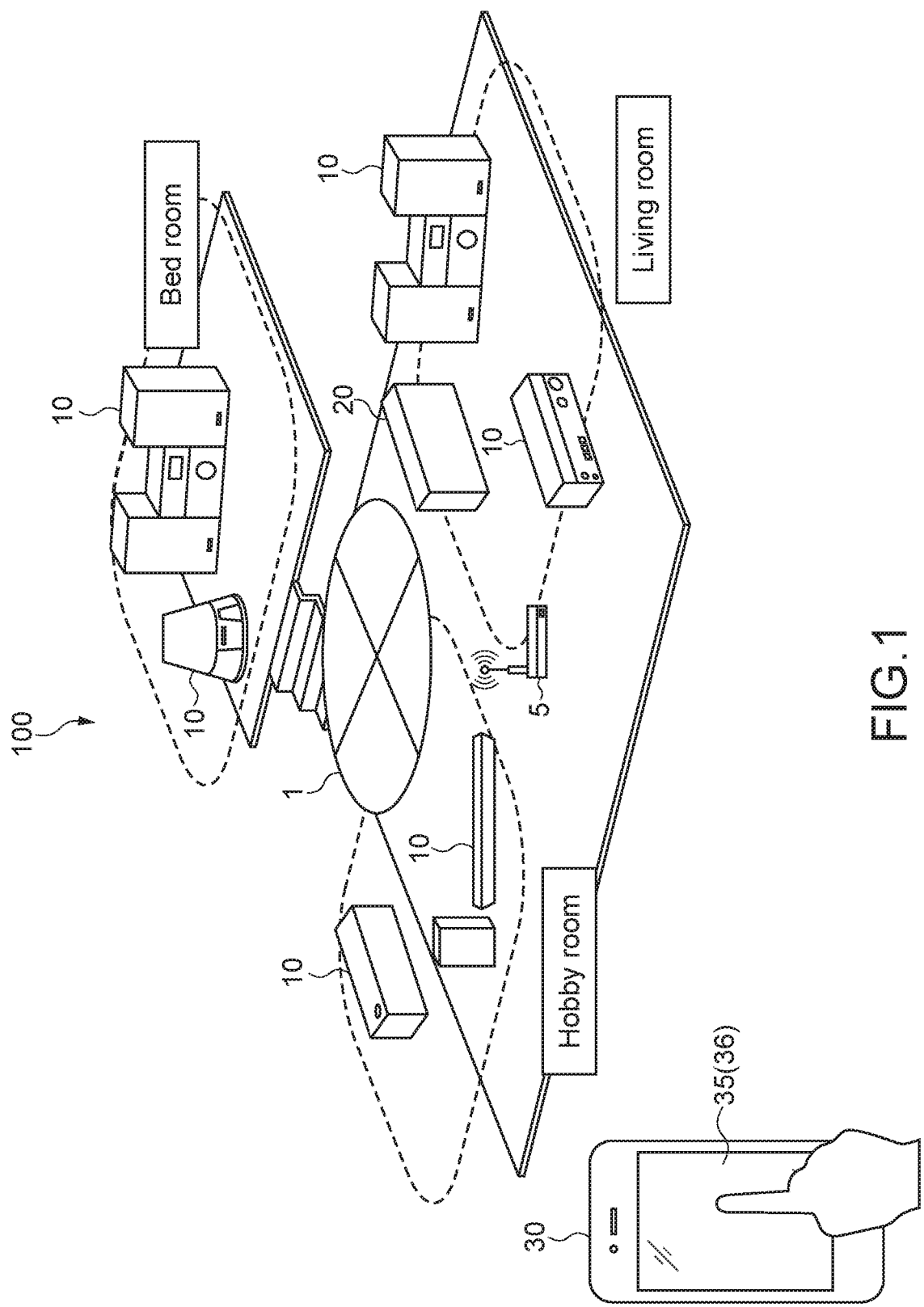
FIG. 1 is a schematic diagram showing a configuration example of a content reproduction system according to a first embodiment.

FIG. 1 is a schematic diagram showing a configuration example of a content reproduction system according to a first embodiment of the present technology. A content reproduction system 100 corresponds to an embodiment of an information processing system according to the present technology and includes a home network 1 established in a house, a plurality of reproduction apparatuses 10, a server apparatus 20 that provides content, and a portable terminal 30.

The plurality of reproduction apparatuses 10, the server apparatus 20, and the portable terminal 30 are connected to the home network 1 via the access point 5 by wireless LAN communication such as WiFi. As the home network 1, a network conforming to, for example, the DLNA (registered trademark) (Digital Living Network Alliance) standard is used.

For example, the plurality of reproduction apparatuses 10 each function as a DMR (Digital Media Renderer), and the server apparatus 20 functions as a DMS (Digital Media Server). Further, the portable terminal 30 functions as a DMC (Digital Media Controller). It should be noted that the present technology is also applicable to a case where a network using another protocol is established.

As shown in FIG. 1, the plurality of reproduction apparatuses 10 are disposed in respective rooms of a living room, a hobby room, and a bed room. The portable terminal 30 transmits an instruction to acquire content from the server apparatus 20 and reproduce the content, to each reproduction apparatus 10, by using, for example, a control message such as UPnP (Universal Plug and Play).

Therefore, a user can control a reproduction operation of the reproduction apparatus 10 disposed in each room by operating the portable terminal 30. It should be noted that using near field communication such as Bluetooth (registered trademark) to cause the reproduction apparatus 10 to reproduce the content can also be enabled.

In this embodiment, music content is reproduced by the plurality of reproduction apparatuses 10. However, the present technology is not limited to the reproduction of music content, and can be applied to reproduction of various kinds of content such as video. Further, the number of reproduction apparatuses 10, the number of server apparatuses 20, or the like is not also limited.

As the reproduction apparatuses 10, for example, various CE (Consumer Electronics) devices such as a television apparatus, a PC (Personal computer), an audio video receiver, a video monitor, and a home video game machine are used. Further, the reproduction apparatuses according to the present technology also include an in-vehicle audio that is mounted to a car, a headphone to be worn by the user, and the like.

As the server apparatus 20, for example, a PC, a network-ready HDD (NAS), or the like is used. As the portable terminal 30, typically, a smartphone is used, but the portable terminal 30 is not limited thereto. Various PDAs (Personal Digital Assistant) such as a tablet terminal may be used. In addition thereto, various computers are each usable as an information processing apparatus according to the present technology.

[Configuration of Portable Terminal]

Figure 2:
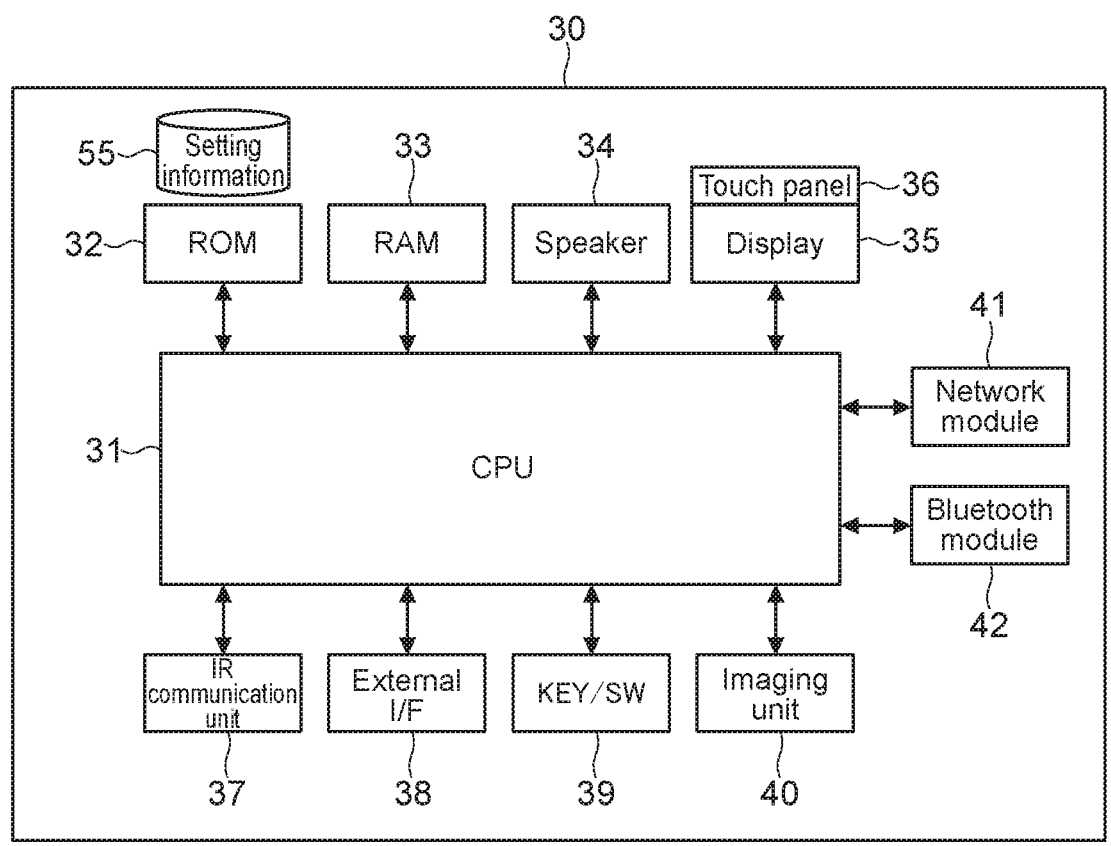
FIG. 2 is a block diagram showing a configuration example of a portable terminal.

FIG. 2 is a block diagram showing a configuration example of the portable terminal 30. The portable terminal 30 includes a CPU (Central Processing Unit) 31, a ROM (Read Only Memory) 32, a RAM (Random Access Memory) 33, a speaker 34, a display 35, and a touch panel 36. Further, the portable terminal 30 includes an infrared ray (IR) communication unit 37, an external I/F (interface) 38, a key/switch 39, and an imaging unit 40. Furthermore, the portable terminal 30 includes a network module 41 and a Bluetooth module 42.

The CPU 31 exchanges signals with respective blocks of the portable terminal 30 to perform various kinds of operations, and collectively controls various kinds of processing executed in the portable terminal 30, such as instruction for the reproduction apparatuses 10 to reproduce content and for the display 35 (touch panel 36) to display a GUI (Graphical User Interface).

The ROM 32 stores various kinds of data processed by the CPU 31, such as various kinds of image data and metadata, and various programs such as an application. The RAM 33 is used as a working area of the CPU 31. When a program such as an application is executed, various kinds of data necessary for the execution are loaded into the RAM 33.

Instead of or in addition to the ROM 32, an HDD (Hard Disk Drive), a flash memory, or another non-volatile memory such as a solid-state memory may be provided. Additionally, in these storage devices, the above-mentioned various kinds of data or programs may be stored. In addition thereto, an arbitrary non-transitory computer readable recording medium may be used.

As schematically shown in FIG. 2, in this embodiment, a storage unit is constituted by the ROM 32, the HDD, or the like, and a setting information DB 55 is thus established. Setting information is information for communicably connecting to the access point 5 and includes an SSID (Service Set Identifier) that identifies the access point 5, and a password. For example, in a case where the plurality of access points 5 are used, the setting information of each access point 5 is stored in the setting information DB 55.

The speaker 34 reproduces music content and outputs an audio guide or the like to the user. The display 35 is, for example, a display device using a liquid crystal, an EL (Electro-Luminescence), or the like and displays various GUIs or the like. As shown in FIG. 2, the display 35 is formed integrally with the touch panel 36.

The IR communication unit 37 is a module for executing IR communication with an external apparatus. The external I/F 38 is an interface for connecting to an external apparatus on the basis of, for example, the standards such as a USB and an HDMI (registered trademark) (High-Definition Multimedia Interface).

The key/switch 39 receives an operation performed by the user 5, which cannot be input particularly via the touch panel 36, such as a power supply switch or a short cut key. The imaging unit 40 includes, for example, a CMOS (Complementary Metal Oxide Semiconductor) or CCD (Charge Coupled Devices) sensor, and generates a digital image of a subject.

The network module 41 is an interface for connecting to the home network 1, and, for example, a wireless LAN module for WiFi or the like is used therefor. When the network module 41 operates, the wireless communication with the reproduction apparatus 10 or the server apparatus 20 is enabled.

The Bluetooth module 42 is a module for executing near field communication, which conforms to a Bluetooth standard, with each of the plurality of reproduction apparatuses 10. In this embodiment, communication (BLE communication) conforming to the BLE (Bluetooth Low Energy) standard and near field communication (BT communication) conforming to the Classic Bluetooth standard are executable.

Further, the Bluetooth module 42 is capable of receiving a beacon signal conforming to the BLE standard. Information included in the received beacon signal is output to the CPU 31 and is subjected to various kinds of processing. Further, it is also possible to calculate a distance from a device that has output the beacon signal, on the basis of the intensity of the beacon signal (radio field intensity).

When the CPU 31 controls the Bluetooth module 42, a reception unit, a transmission unit, and a first communication unit according to this embodiment are achieved. It should be noted that the present technology is applicable to near field communication and a beacon signal that conform to another arbitrary standard.

The information processing performed by the portable terminal 30 having the above-mentioned hardware configuration is achieved by cooperation of software stored in the ROM 32 or the like and a hardware resource of the portable terminal 30. For example, when the CPU 31 loads the program (application) according to the present technology stored in the ROM 32 or the like into the RAM 33 to execute it, the information processing method according to the present technology is achieved.

Further, when the CPU 31 executes a predetermined program, a detection unit that is a functional block for executing the information processing method according to the present technology is achieved. In order to achieve this block, dedicated hardware such as an IC (integrated circuit) may be appropriately used.

The program such as an application is installed in the portable terminal 30 from, for example, a global network. Alternatively, the program may be installed in the portable terminal 30 via a recording medium.

[Configuration of Reproduction Apparatus]

The reproduction apparatus 10 includes a block for reproducing content (speaker, display, and the like), a network module 11 (see FIG. 3), a Bluetooth module 12 (see FIG. 3 again), a control block (CPU, ROM, RAM, and the like) for controlling those described above, and the like. For example, the reproduction apparatus 10 can also be achieved by a configuration substantially equal to that of the portable terminal 30 shown in FIG. 2. As a matter of course, the present technology is not limited to the above.

A storage unit is constituted by the ROM and the like within the reproduction apparatus 10, and a setting information DB for connecting to the access point 5 is thus established. For example, in a case where setting information regarding an access point 5 detected via the network module 11 is stored, it is possible to connect to the access point 5 by reading the setting information.

In this embodiment, a BLE beacon signal 50 (see FIG. 3) can be transmitted by the Bluetooth module 12 of the reproduction apparatus 10. The beacon signal includes, for example, device information such as a model number of the reproduction apparatus 10 and a unique ID such as a Bluetooth address.

Figure 3:
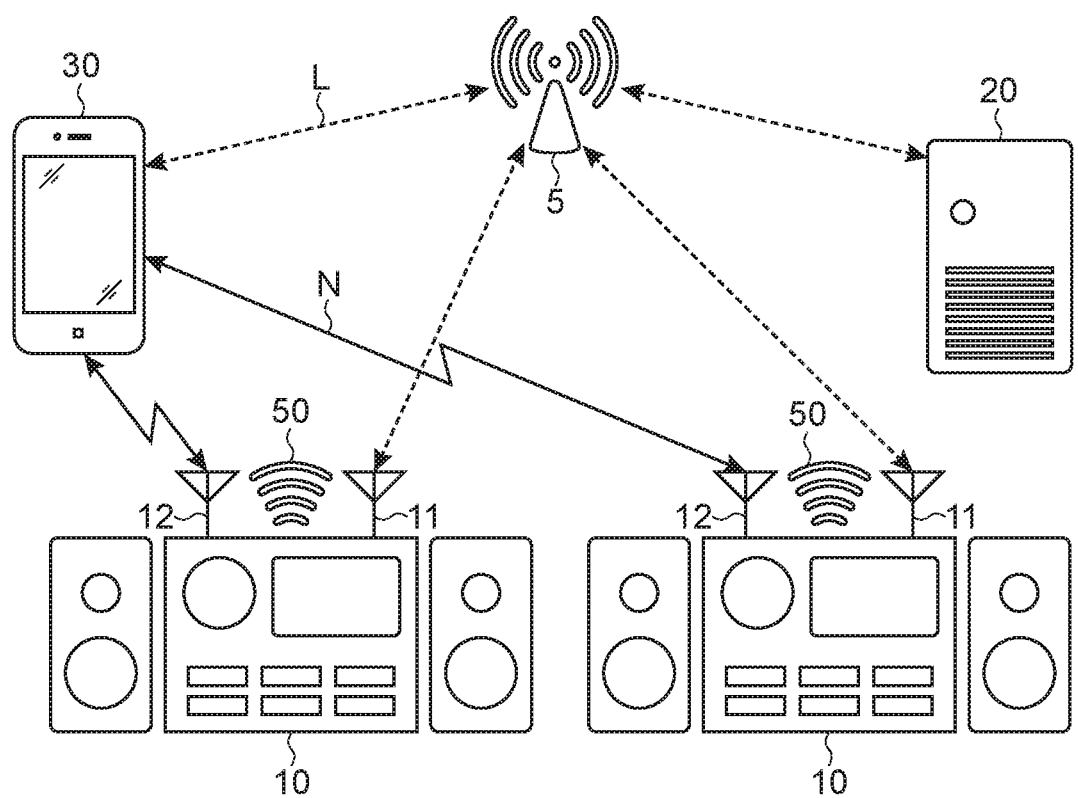
FIG. 3 is a diagram schematically showing a connection mode of a plurality of reproduction apparatuses, a server apparatus, and a portable terminal.

FIG. 3 is a diagram schematically showing a connection mode of the plurality of reproduction apparatuses 10, the server apparatus 20, and the portable terminal 30. As described above, the plurality of reproduction apparatuses 10, the server apparatus 20, and the portable terminal 30 are connectable to one another via the access point 5 by wireless LAN communication (arrows L of broken lines). The portable terminal 30 is capable of transmitting a control message or the like to control an operation of the reproduction apparatus 10.

For example, it is possible to cause the reproduction apparatus 10 to acquire content from the server apparatus 20 and reproduce the content. Further, it is possible to perform various kinds of control such as power supply control for the reproduction apparatus 10 (e.g., switching between standby state and active state), control of the volume of reproduction of content, switching of content to be reproduced, and fade-in/fade-out of content.

Further, the portable terminal 30 is directly connectable to each reproduction apparatus 10 by BLE communication or the like (arrows N of solid lines). By the BLE communication or the like, a reproduction operation of the content or various other operations performed by the reproduction apparatus 10 can be controlled.

[Network Setting for Reproduction Apparatus]

The network setting by which the reproduction apparatus 10 is to be connected to the home network 1 by using the portable terminal 30 will be described. Typically, the network setting is processing used for network initialization when a new reproduction apparatus 10 is disposed, but the present technology is not limited thereto as a matter of course. For example, the present technology is also applicable to the change of an access point as a connection destination, or the like.

The network setting is processing of establishing wireless LAN connection (arrows L of FIG. 3) between the access point 5 and each of the reproduction apparatuses 10. In the following description, the reproduction apparatus 10 that transmits the beacon signal 50 corresponds to a first apparatus (apparatus). Further, the access point 5 that establishes the home network 1 as a wireless network corresponds to a second apparatus (communication apparatus). Further, the portable terminal 30 corresponds to a control apparatus.

It is assumed that the portable terminal 30 is already connected to the access point 5 by the wireless LAN. The network setting according to this embodiment can also be assumed as processing of sharing the setting for the portable terminal 30 to connect to the access point 5 together with the reproduction apparatus 10.

Figure 4:
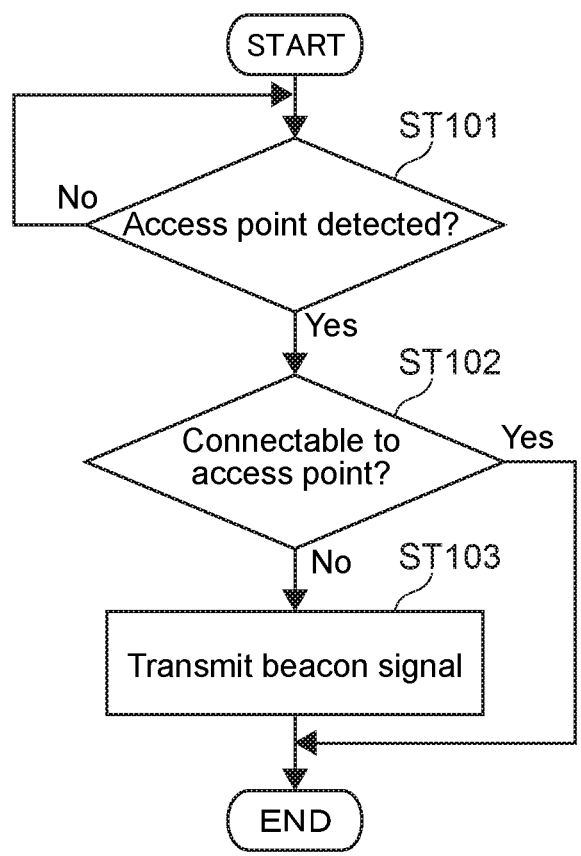
FIG. 4 is a flowchart showing an operation example of the reproduction apparatus.

FIG. 4 is a flowchart showing an operation example of the reproduction apparatus 10. When the CPU or the like of the reproduction apparatus 10 executes a predetermined program, each step is executed.

The detection of the access point 5 is executed, and the presence/absence of the access point 5 is determined (Step 101). For example, when the power supply of the reproduction apparatus 10 is turned on, a detection mode of the access point 5 is executed. Additionally, it is determined whether radio waves transmitted from the access point 5 are received or not by the network module 11. The detection of the access point 5 is executed regularly, for example (the loop of No of Step 101).

When the access point 5 is detected (Yes of Step 101), it is determined whether connection to the detected access point 5 is enabled or not (Step 102). In this embodiment, it is determined whether setting information regarding the detected access point 5 (SSID and password) is stored or not in the setting information DB established in the storage unit of the reproduction apparatus 10.

When connection to the detected access point 5 is not enabled (No of Step 102), the beacon signal 50 is transmitted by the Bluetooth module 12 (Step 103). When connection to the access point 5 is enabled (Yes of Step 102), the processing is terminated without transmitting the beacon signal 50. Subsequently, typically, the processing of connecting to the access point 5 is executed automatically or according to an instruction of the user.

The reproduction apparatus 10, which is not connectable to the access point 5 and has transmitted the beacon signal 50, becomes an unconnected apparatus 15 (see FIG. 5) that is not communicably connected to the access point 5. In this embodiment, the network setting is executed for the unconnected apparatus 15.

Figure 5:
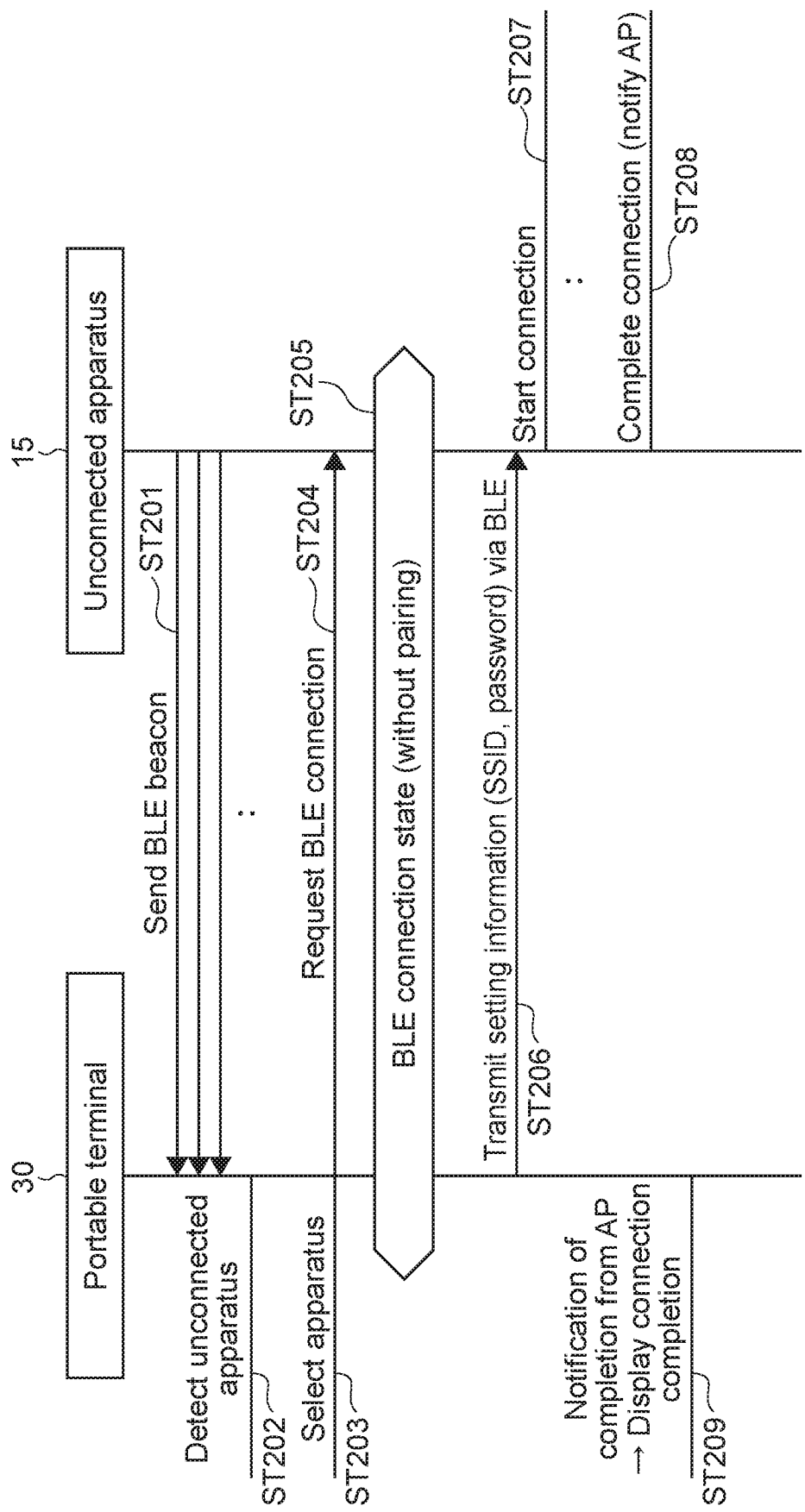
FIG. 5 is a sequence diagram showing a processing example of network setting for an unconnected apparatus.

FIG. 5 is a sequence diagram showing a processing example of the network setting for the unconnected apparatus 15. For example, when the mode of executing the network setting or the like is selected by the user, the processing shown in FIG. 5 is executed, but the present technology is not limited thereto as a matter of course.

In the example shown in FIG. 5, a single unconnected apparatus 15 is shown, but the same processing is executed for a plurality of unconnected apparatuses 15. For example, the processing shown in FIG. 5 may be executed simultaneously or one by one in a sequential order for the plurality of unconnected apparatuses 15.

The unconnected apparatus 15 transmits the beacon signal 50 at predetermined intervals (Step 201). The Bluetooth module 42 that functions as the reception unit of the portable terminal 30 receives the beacon signal 50. The CPU 31 that functions as the detection unit then detects the unconnected apparatus 15 that has transmitted the beacon signal 50 (Step 202).

The detection processing corresponds to processing of detecting the unconnected apparatus 15, which is not connected to the access point 5, from the plurality of reproduction apparatuses 10 on the basis of the beacon signal 50 received from each of the plurality of reproduction apparatuses 10.

In this embodiment, the reproduction apparatus 10 that is to be the unconnected apparatus 15 transmits the beacon signal 50, and the reproduction apparatus 10 that is communicable to the access point 5 does not transmit the beacon signal 50. Therefore, the plurality of reproduction apparatuses 10 that have transmitted the received beacon signals 50 are each detected as the unconnected apparatus 15 as it is.

The detected unconnected apparatus 15 is displayed on the touch panel 36 of the portable terminal 30. At that time, a distance calculated on the basis of the intensity of the beacon signal 50 may also be displayed together. Alternatively, depending on the calculated distance, the unconnected apparatus 15 may be sorted and displayed in a list. This allows the user to easily associate the unconnected apparatus 15 displayed on the touch panel 36 and a reproduction apparatus 10 being in sight actually with each other. As a result, it is possible to easily confirm the reproduction apparatus 10 for which the network setting is desired to be performed, and to achieve improvement in security.

An unconnected apparatus 15, which is desired to be connected to the access point 5, is selected by the user (Step 203). A plurality of unconnected apparatuses 15 can be simultaneously selected as a matter of course.

A BLE connection request is transmitted from the portable terminal 30 to the unconnected apparatus 15 selected by the user (Step 204). In response to this request, the portable terminal 30 and the unconnected apparatus 15 enter a BLE connection state, so that BLE communication (arrows N of FIG. 3) is established (Step 205). This BLE communication is established via the Bluetooth module 42 that functions as the first communication unit.

It should be noted that the BLE connection can take both of a mode of executing pairing and a mode of connecting without pairing. In this embodiment, the BLE connection without pairing is executed. Accordingly, it is unnecessary to perform an operation such as pass key authentication and it is possible to easily connect both of the devices to each other. As a matter of course, the present technology is also applicable to a case where pairing is executed.

The setting information including the SSID and the password is transmitted from the portable terminal 30 to the unconnected apparatus 15 via the established BLE communication (Step 206). The unconnected apparatus 15 stores the setting information, which has been transmitted from the portable terminal 30, in the setting information DB. The unconnected apparatus 15 then starts wireless LAN connection, i.e., connection to the access point 5 on the basis of the setting information (Step 207). When the connection to the access point 5 is completed, a notification of connection completion is transmitted to the access point (described as AP in the figure) (Step 208).

After transmitting the setting information in Step 206, the portable terminal 30 waits for a notification of connection completion from the access point 5. In a case where the notification of connection completion is received from the access point 5, the portable terminal 30 displays, on the touch panel 36, a GUI indicating that the network setting has been completed (Step 209). Accordingly, the fact that the network setting for the unconnected apparatus 15 has been completed is fed back to the user.

After the transmission of the setting information, in a case where a notification of connection completion is not received even after the elapse of a predetermined time, it is determined that the setting has failed, and predetermined processing performed at the time of failing, such as an error indication or retransmission of the setting information, is executed. At that time, in a case where the network setting is performed on the plurality of unconnected apparatuses 15 one by one in a sequential order, the portable terminal 30 waits for a notification of connection completion for each of the unconnected apparatuses 15 one by one from the access point 5. In a case where the network setting is simultaneously executed in a lump, the portable terminal 30 waits for notifications of connection completion for all of the unconnected apparatuses 15.

It should be noted that a notification of connection completion, a notification of an error, or the like may be transmitted from the unconnected apparatus 15 to the portable terminal 30 via the BLE communication.

It should be noted that a connection request may be automatically transmitted to the detected unconnected apparatus 15 without performing the selection by the user in Step 203. Accordingly, the user only needs to approach a reproduction apparatus 10 desired to be connected to the access point 5, and thus the network setting is automatically executed. Meanwhile, when the selection is performed by the user, it is possible to prevent connection to an unintended device or the like and achieve improvement in security.

In Step 101 of FIG. 4, when the reproduction apparatus 10 detects a plurality of access points 5, and, for example, when even one access point 5 to which connection is not enabled exists, the beacon signal 50 is transmitted. The portable terminal 30, which has received the beacon signal 50, transmits setting information regarding all the access points 5 to the unconnected apparatus 15. By appropriately using the received setting information, the unconnected apparatus 15 executes connection processing for the access point 5 that is not connectable. Instead, in a case where the reproduction apparatus 10 cannot be connected to all the access points 5, a method of transmitting the beacon signal 50 may be employed.

In the present disclosure, the unconnected apparatus 15 means an apparatus that is not connected to the access point 5. In other words, an apparatus that is connectable to the access point 5 but is not currently connected is also included in the unconnected apparatus 15.

Therefore, the processing shown in FIGS. 4 and 5 is a network setting method for the reproduction apparatus 10 that is an unconnected apparatus 15 and cannot be connected to the access point 5. Instead of this, irrespective of whether connection is enabled or not, processing of transmitting the setting information to the unconnected apparatus 15 is also included in the present technology.

For example, instead of Step 102 of FIG. 4, whether the reproduction apparatus 10 is currently connected to the access point 5 or not may be detected. When the reproduction apparatus 10 is not connected, the beacon signal 50 may be transmitted. In this case, the BLE communication may be established for the reproduction apparatus 10 in which the setting information is already stored, and then the setting information may be transmitted, but there are no problems in particular. In any case, the network setting can be executed for the plurality of reproduction apparatuses 10 in which the setting information is not stored.

As described above, in the content reproduction system 100 according to this embodiment, the unconnected apparatus 15 is detected on the basis of the beacon signals 50 transmitted from the plurality of reproduction apparatuses 10. Additionally, the setting information for communicably connecting to the access point 5 is transmitted to the unconnected apparatus 15. Accordingly, the connection to the access point 5 can be easily executed.

As a method of performing the network setting for the reproduction apparatus 10 by using the portable terminal 30, a method of establishing wireless LAN communication between the portable terminal 30 and the reproduction apparatus 10 or a method of executing Bluetooth pairing is conceived. In the method, it is necessary for the reproduction apparatus 10 to perform an operation of setting the reproduction apparatus 10 to an access point mode or pairing mode. Further, it is also necessary for the portable terminal 30 to perform an operation of switching the wireless LAN connection from the access point 5 to the reproduction apparatus 10 or an operation for executing the Bluetooth pairing.

In other words, it is necessary for the user to perform a complicated operation, and the operability of the network setting is low. As a result, there is a high possibility that the user hesitates to perform an operation and cannot perform the network setting.

In contrast to this, in this embodiment, if a reproduction apparatus 10 is in the ON state, it is possible to easily detect the reproduction apparatus 10 by using the beacon signal 50. Further, the BLE connection with the detected reproduction apparatus 10 is easily achieved, which makes it possible to easily transmit the setting information for connecting to the access point 5. As a result, the user can easily perform the network setting for the unconnected apparatus 15 detected on the basis of the beacon signal 50. Further, since the network setting can be performed for the plurality of unconnected apparatuses 15 in a lump, very high operability is exerted.

Second Embodiment

A content reproduction system of a second embodiment according to the present technology will be described. In the following description, regarding parts similar to the configuration and action in the content reproduction system 100 described in the above embodiment, description thereof will be omitted or simplified.

In the embodiment described above, the presence/absence of the transmission of the beacon signal 50 is controlled by the reproduction apparatus 10 depending on the connection state with respect to the access point 5. For example, as shown in the flowchart of FIG. 4, it is determined whether connection to the access point 5 is enabled or not, and if not, the beacon signal 50 is transmitted. Further, as a modified example thereof, irrespective of whether connection is enabled or not, the method of transmitting the beacon signal 50 when an unconnected apparatus 15 is detected has also been described.

In this embodiment, the transmission control for the beacon signal 50 according to the connection state with respect to the access point 5 is not executed. In other words, the reproduction apparatus 10 can transmit the beacon signal 50 irrespective of whether the reproduction apparatus 10 itself is an unconnected apparatus 15 that is connectable to the access point 5, an unconnected apparatus 15 that is not connectable thereto, or a connected apparatus that is already communicably connected to the access point 5.

Additionally, in this embodiment, the following situation is created by the portable terminal 30: out of the plurality of reproduction apparatuses 10, only an unconnected apparatus 15 that is not connected to the access point 5 transmits the beacon signal. Therefore, in this embodiment, the CPU 31 of the reproduction apparatus 10 operates as a request unit. Further, when the network module 41 of the reproduction apparatus 10 is controlled by the CPU 31, a second communication unit is achieved.

Figure 6:
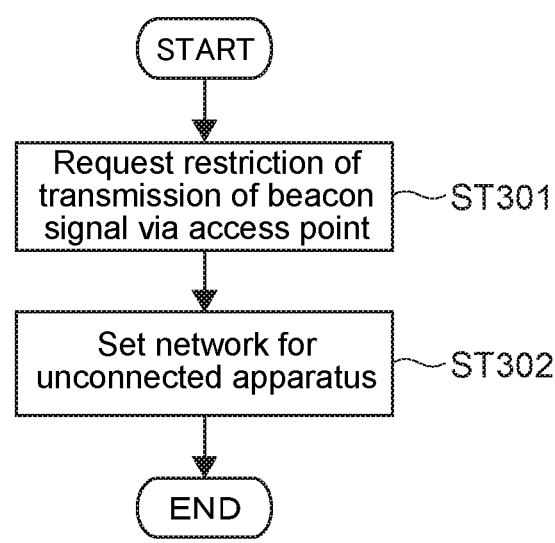
FIG. 6 is a flowchart showing a processing example of network setting by a portable terminal.

FIG. 6 is a flowchart showing a processing example of network setting by the portable terminal 30. The CPU 31 that functions as the request unit transmits a request, which indicates the restriction of the transmission of the beacon signal 50, to a connected apparatus in the plurality of reproduction apparatuses 10 that is communicably connected to the access point 5, via the network module 41 and the access point 5 (Step 301).

In other words, a control message or the like indicating that the transmission of the beacon signal 50 is to be stopped is transmitted to the reproduction apparatus 10 already connected to the home network 1, via the access point 5. Accordingly, the following situation is achieved: only an unconnected apparatus 15 that is not connected to the access point 5 transmits the beacon signal 50. It should be noted that the method of transmitting the control message or the like is not limited, and transmission by multicast, broadcast, or the like may be executed.

Subsequently, the network setting for the unconnected apparatus 15, which is shown in FIG. 5 as an example, is executed (Step 302). In such a manner, when the restriction of the transmission of the beacon signal 50 is requested to the reproduction apparatus 10 already connected to the access point 5, it is possible to easily detect the reproduction apparatus 10 that has transmitted the beacon signal 50 as an unconnected apparatus 15. As a result, it is possible to easily connect the unconnected apparatus 15 to the access point 5.

Further, since the plurality of reproduction apparatuses 10 are capable of transmitting the beacon signal 50 irrespective of the connection state with respect to the access point 5, the beacon signal 50 can be used for another use application. For example, it is possible to execute the control of reproducing various kinds of content, which is based on a distance to the reproduction apparatus 10 or the like. Further, another mode and the network setting mode according to the present technology can be used in combination.

In a case where the plurality of access points 5 are used, the processing shown in FIG. 6 can be executed for each access point 5. For example, in a case where access points A and B are used, the transmission of a beacon signal 50 of a reproduction apparatus 10 connected to the access point A is restricted. Additionally, setting information for connecting to the access point A is transmitted to the reproduction apparatus (unconnected apparatus 15) that has transmitted the beacon signal 50, via the BLE communication. Similar processing is also executed for the access point B. Accordingly, regarding both of the access points A and B, the network setting for the plurality of reproduction apparatuses 10 can be executed all together. As a matter of course, the setting information of both of the access points A and B may be transmitted to the unconnected apparatus 15.

Other Embodiments

The present technology is not limited to the embodiments described above, and other various embodiments can be achieved.

In the above description, the beacon signal is transmitted from only the unconnected apparatus that is not connected to the access point. Therefore, the reproduction apparatus that has transmitted the beacon signal is detected as an unconnected apparatus as it is. The present technology is not limited to the above, and as the method of detecting the unconnected apparatus from the plurality of reproduction apparatuses on the basis of the beacon signal, another method may be used.

For example, it may be possible to inquire about whether the plurality of reproduction apparatuses are unconnected apparatuses or not, via the BLE communication established on the basis of the beacon signal. Additionally, an unconnected apparatus may be detected on the basis of information regarding whether the unconnected apparatus is an unconnected apparatus or not, the information being acquired from the plurality of reproduction apparatuses. Accordingly, without executing the processing of Step 101 of FIG. 4 or the processing of Step 301 of FIG. 5, it is possible to easily detect an unconnected apparatus and to connect to the access point.

Further, the beacon signal transmitted from the reproduction apparatus may include setting information for connecting to another device, or the like. The setting information for connection includes, for example, the presence/absence of wireless LAN connection or BLE connection and information on whether connection to the access point is enabled or not. The portable terminal is capable of easily detecting an unconnected apparatus on the basis of the setting information for connection, which is included in the received beacon signal. As a result, when the setting information is transmitted to the unconnected apparatus or the reproduction apparatus that is an unconnected apparatus and is not connectable, the network setting can be easily executed.

The setting information for connecting to the access point may include, for example, an encryption scheme such as WEP (Wired Equivalent Privacy), TKIP (Temporal Key Integrity Protocol), or CCMP (Counter mode with CBC-MAC Protocol). In addition thereto, various kinds of information necessary to connect arbitrary apparatuses, which are assumed as a first apparatus and a second apparatus, may be used.

Further, in the above description, the setting information is transmitted via the BLE communication established on the basis of the BLE beacon signal, but the present technology is not limited thereto. The setting information may be transmitted via another arbitrary communication path that is different from the wireless LAN communication. In other words, a communication path that is different from the communication based on the beacon signal may be used. For example, in a case where a BT history of the past BT communication or the like is provided, this history information may be used to execute BT pairing, and the setting information may be transmitted via the BT communication. Alternatively, if the wireless LAN connection in which the portable terminal has been used as an access point in the past is executed, that wireless LAN connection (another wireless LAN connection) may be established to transmit the setting information.

Even in a case where the reproduction apparatus transmits the beacon signal irrespective of the connection state to the access point, the setting information may be transmitted to all the reproduction apparatuses that transmit the beacon signals. Also in this case, the network setting can be executed for the plurality of unconnected apparatuses in a lump.

In the above description, the case where the information processing method according to the present technology is executed by a computer such as a portable terminal operated by the user has been described. However, the information processing method and a program according to the present technology may be executed by another computer that is communicable with a computer operated by the user via a network or the like. Further, the computer operated by user and another computer may cooperate with each other to establish the content reproduction system according to the present technology.

In other words, the information processing method and the program according to the present technology can be executed by not only a computer system including a single computer but also a computer system in which a plurality of computers operate in conjunction with one another. It should be noted that in the present disclosure, a system means an aggregation of a plurality of constituent elements (apparatus, module (parts), and the like), regardless of whether all constituent elements are included in the same casing or not. Therefore, a plurality of apparatuses housed in separate casings and connected to one another via a network is a system, and one apparatus including a plurality of modules in one casing is also a system.

The execution of the information processing method and the program by the computer system according to the present technology includes, for example, both a case where a single computer executes detection of an unconnected apparatus, the transmission of setting information, and the like and a case where different computers execute each kind of processing. Further, the execution of each kind of processing by a predetermined computer includes causing another computer to execute a part or all of the processing and acquiring a result thereof.

In other words, the information processing method and the program according to the present technology can also be applied to a configuration of cloud computing in which a plurality of apparatuses share one function and cooperate to perform processing via a network.

At least two features of the above-mentioned features according to the present technology may be combined. In other words, various features described in each embodiment may be arbitrarily combined without distinguishing the embodiments with each other. Further, various effects described above are merely examples and are not limited, and additional effects may be exerted.

It should be noted that the present technology may also take the following configurations.

(1) An information processing apparatus, including:
a reception unit that receives a beacon signal transmitted from each of a plurality of first apparatuses;
a detection unit that detects an unconnected apparatus from the plurality of first apparatuses on the basis of the received beacon signal, the unconnected apparatus being not communicably connected to a second apparatus; and
a transmission unit that transmits setting information for communicably connecting to the second apparatus to the detected unconnected apparatus.

(2) The information processing apparatus according to (1), further including
a first communication unit that is communicably connected to each of the plurality of first apparatuses on the basis of the received beacon signal, in which
the transmission unit transmits the setting information via the first communication unit.

(3) The information processing apparatus according to (1) or (2), in which
the detection unit detects, as the unconnected apparatus, each of first apparatuses in the plurality of first apparatuses, each of the first apparatuses having transmitted the received beacon signal.

(4) The information processing apparatus according to (3), further including:
a second communication unit that is communicably connected to the second apparatus; and
a request unit that requests restriction of transmission of the beacon signal to a connected apparatus in the plurality of first apparatuses via the second communication unit and the second apparatus, the connected apparatus being communicably connected to the second apparatus.

(5) The information processing apparatus according to any one of (2) to (4), in which
the detection unit acquires information regarding whether the first apparatus is the unconnected apparatus or not from each of the plurality of first apparatuses via the first communication unit and detects the unconnected apparatus.

(6) The information processing apparatus according to any one of (1) to (5), in which
the second apparatus is an access point that establishes a wireless network,
the unconnected apparatus is an apparatus that is not connected to the wireless network, and
the setting information includes an SSID (Service Set Identifier) that identifies the access point, and a password.

(7) The information processing apparatus according to any one of (2) to (6), in which
the beacon signal is a BLE (Bluetooth Low Energy) beacon signal conforming to a BLE standard, and
the transmission unit transmits the setting information to the unconnected apparatus via BLE communication based on the BLE beacon signal.

(8) The information processing apparatus according to (4), in which
the second apparatus is an access point that establishes a wireless network,
the connected apparatus is an apparatus that is connected to the wireless network, and
the request unit transmits a request to the connected apparatus via the wireless network, the request indicating the restriction of the transmission of the beacon signal.

(9) The information processing apparatus according to (5), in which
the beacon signal is a BLE (Bluetooth Low Energy) beacon signal conforming to a BLE standard, and
the detection unit acquires information regarding whether the first apparatus is the unconnected apparatus or not via BLE communication based on the BLE beacon signal.

REFERENCE SIGNS LIST 1 home network
5 access point
10 reproduction apparatus
11, 41 network module
12, 42 Bluetooth module
15 unconnected apparatus
30 portable terminal
31 CPU
50 BLE beacon signal
55 setting information DB
100 content reproduction system

The invention claimed is:

1. An information processing apparatus, comprising:
a reception unit configured to receive a plurality of beacon signals transmitted from each of a plurality of first apparatuses;
a detection unit configured to detect at least one unconnected apparatus from the plurality of first apparatuses based on the received plurality of beacon signals, wherein the at least one unconnected apparatus is not communicably connected to a second apparatus;
a first communication unit configured to communicably connect to the second apparatus;
a request unit configured to request restriction of transmission of a beacon signal of the plurality of beacon signals to a connected apparatus of the plurality of first apparatuses, wherein the connected apparatus is communicably connected to the second apparatus; and
a transmission unit configured to transmit setting information, for communicably connecting to the second apparatus, to the detected at least one unconnected apparatus.

2. The information processing apparatus according to claim 1, further comprising a second communication unit configured to communicably connect to each of the plurality of first apparatuses based on the received plurality of beacon signals, wherein the transmission unit is configured to transmit the setting information via the second communication unit.

3. The information processing apparatus according to claim 2, wherein the detection unit is further configured to:
acquire information that a first apparatus of the plurality of first apparatuses is the unconnected apparatus via the second communication unit; and
detect the unconnected apparatus based on the acquired information.

4. The information processing apparatus according to claim 3, wherein the beacon signal is a Bluetooth Low Energy (BLE) beacon signal conforming to a BLE standard, and the detection unit is further configured to acquire information that the first apparatus is the unconnected apparatus via BLE communication based on the BLE beacon signal.

5. The information processing apparatus according to claim 2, wherein each of the plurality of beacon signals is a Bluetooth Low Energy (BLE) beacon signal conforming to a BLE standard, and the transmission unit is further configured to transmit the setting information to the unconnected apparatus via BLE communication based on the BLE beacon signal.

6. The information processing apparatus according to claim 1, wherein the second apparatus is an access point that establishes a wireless network, the unconnected apparatus is an apparatus that is not connected to the wireless network, and the setting information includes a Service Set Identifier (SSID) that identifies the access point and a password.

7. The information processing apparatus according to claim 1, wherein the second apparatus is an access point that establishes a wireless network, the connected apparatus is an apparatus that is connected to the wireless network, and the request unit is further configured to transmit a request to the connected apparatus via the wireless network, wherein the request indicates the restriction of the transmission of the beacon signal.

8. An information processing method to be executed by a computer system, the information processing method comprising:

receiving a plurality of beacon signals transmitted from each of a plurality of first apparatuses;

detecting at least one unconnected apparatus from the plurality of first apparatuses based on the received plurality of beacon signals, wherein the at least one unconnected apparatus is not communicably connected to a second apparatus;

communicably connecting to the second apparatus;

requesting restriction of transmission of a beacon signal of the plurality of beacon signals to a connected apparatus of the plurality of first apparatuses, wherein the connected apparatus is communicably connected to the second apparatus; and transmitting setting information, for communicably connecting to the second apparatus, to the detected at least one unconnected apparatus.

9. A non-transitory computer-readable medium having stored thereon computer-executable instructions, that when executed by a processor, cause the processor to execute operations, the operations comprising receiving a plurality of beacon signals transmitted from each of a plurality of first apparatuses;

detecting at least one unconnected apparatus from the plurality of first apparatuses based on the received plurality of beacon signals, wherein the at least one unconnected apparatus is not communicably connected to a second apparatus;

communicably connecting to the second apparatus;

requesting restriction of transmission of a beacon signal of the plurality of beacon signals to a connected apparatus of the plurality of first apparatuses, wherein the connected apparatus is communicably connected to the second apparatus; and transmitting setting information, for communicably connecting to the second apparatus, to the detected at least one unconnected apparatus.

10. An information processing system, comprising:

a communication apparatus;

a plurality of apparatuses configured to:

detect whether each of the plurality of apparatuses is communicably connected to the communication apparatus, and transmit at least one beacon signal based on the detection that at least one apparatus of the plurality of apparatuses is not communicably connected to the communication apparatus; and a control apparatus configured to:

request restriction of transmission of a beacon signal of the at least one beacon signal to a connected apparatus of the plurality of apparatuses, wherein the connected apparatus is communicably connected to the communication apparatus, and transmit setting information, for communicably connecting the communication apparatus, to an unconnected apparatus in the plurality of apparatuses based on a specific beacon signal transmitted from the unconnected apparatus, wherein the unconnected apparatus is not communicably connected to the communication apparatus.

* * * * *